United States Patent
Abdel-Mottaleb et al.

(10) Patent No.: US 6,263,113 B1
(45) Date of Patent: Jul. 17, 2001

(54) METHOD FOR DETECTING A FACE IN A DIGITAL IMAGE

(75) Inventors: Mohamed Abdel-Mottaleb, Ossining, NY (US); Ahmed Elgammal, Greenbelt, MD (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/210,415

(22) Filed: Dec. 11, 1998

(51) Int. Cl.$^7$ .................................................. G06K 9/36
(52) U.S. Cl. ......................... 382/237; 382/224; 382/118; 382/170
(58) Field of Search ..................... 382/237, 118, 382/170, 266, 190, 308, 199, 224; 384/521, 522; 348/169, 77

(56) References Cited

U.S. PATENT DOCUMENTS

| | | | |
|---|---|---|---|
| 5,781,650 | * 7/1998 | Lobo et al. | 382/118 |
| 5,905,807 | * 5/1999 | Kado et al. | 382/118 |
| 5,912,721 | * 6/1999 | Yamaguchi et al. | 351/210 |
| 6,072,903 | * 6/2000 | Maki et al. | 382/190 |

FOREIGN PATENT DOCUMENTS

| | | | |
|---|---|---|---|
| 0654749 A2 | * 5/1995 | (EP) | G06K/9/00 |
| 0836326A2 | 4/1998 | (EP) | H04N/7/26 |
| 363223947 | * 9/1998 | (JP) | G06F/15/70 |

OTHER PUBLICATIONS

Takacs, "Face Recognition Using Binary Image Metrics", IEEE, pp. 294–299, 1998.*
"A Sketch Retrieval Method for Full Color Image Database", by Toshikazu Kato et al, IEEE, 1992, pp. 530–533.
"Image Retrieval Using Color and Shape", by Anil K. Jain et al, Pattern Recognition, vol. 29, No. 3, 1996, pp. 1233–1244.
"Object oriented face detection using range and color information", by Sang Hoon Kim et al, Proceedings Third IEEE International Conference, published 1998, Abstract.
"Automatic detection of human faces in natural scene images by use of a skin color model and of invariant moments", by JC Terrillon et al, Proceedings Third IEEE International Conference, published 1998, Abstract.
"Face–Textured Model Based on SGLD and Its Application in Face Detection in a Color Scene", Ying Dai et al, Pattern Recognition, vol. 29, No. 6, pp. 1007–1017, 1996.
"Finding facial features using an HLS colour space", P. Ranefall et al, Image Analysis and Processing, 8th International Conference, ICIAP '95, pp. 191–196, 1995.

* cited by examiner

*Primary Examiner*—Jose L. Couso
*Assistant Examiner*—Anh Hong Do

(57) ABSTRACT

In order to detect a face disposed within a digital image, the pixels of the image are grouped based on whether they are skin color. The edges of the skin colored areas are removed by eliminating pixels that have surrounding pixels with a high variance in the luminance component. The resulting connected components are classified to determine whether they could include a face. The classification includes examining: the area of the bounding box of the component, the aspect ratio, the ratio of detected skin to the area of the bounding box, the orientation of elongated objects, and the distance between the center of the bounding box and the center of mass of the component. Components which are still considered facial candidates are mapped on to a graph. The minimum spanning trees of the graphs are extracted and the corresponding components which remain are again classified for whether they could include a face. Each graph is split into two by removing the weakest edge and the corresponding components which remain are yet again classified. The graph is continually broken down until a bounding box formed around the resulting graphs is smaller than a threshold. Finally, a heuristic is performed to eliminate false positives. The heuristic compares the ratio of pixels with high variance to the total number of pixels in a face candidate component.

5 Claims, 9 Drawing Sheets

METHOD FOR DETECTING A FACE IN A DIGITAL IMAGE

BACKGROUND OF THE INVENTION

This invention relates to the field of image detection and more specifically to the detection of a face disposed within a digital image.

As broadcasting becomes more digitally based, it becomes easier to archive and catalog video content. Researchers have developed systems for content-based image and video indexing and retrieval that utilize low-level visual features (semantics) like color, texture, shape and sketch of an image. To facilitate the automatic archiving and retrieval of video material based on higher level semantics, it is important to detect and recognize events in video clips. Human activities are important events in video clips and face detection is a step toward the recognition of human activities.

Face detection is also useful in security systems, criminal identifications, digital image capturing, and teleconferences. In a security system, for example, it is useful to detect the facial portions of an image being viewed so that an operator of the system can discern whether a human is present in the image.

The detection of faces from images has not received much attention by researchers. Most conventional techniques concentrate on face recognition and assume that a face has been identified within the image or assume that the image only has one face as in a "mug shot" image. Such conventional techniques are unable to detect faces from complex backgrounds.

One prior art technique that does perform face detection determines whether a cluster of pixels conforms to a facial template. This routine is deficient because of different scales and orientations of possible faces. The template itself is one size and orientation and will not detect faces which are of a different size or are rotated. Consequently, the template itself must be scaled up and down and rotated while searching is performed yielding a search space that is too big to be useful or practical. Some prior art techniques, like EPA 0836326 A2, use merely a shape template to see if a cluster of pixels conforms to that shape. In addition to the scaling and rotation problems mentioned above, this solution is too simplistic to be used with complex backgrounds which may have many objects with the same shape as a face and perhaps even the same color as a face.

Therefore, there exists a need for a method of detecting faces within a digital image in which the face is disposed within a complex background.

SUMMARY AND OBJECTS OF THE INVENTION

One aspect of the invention is a method for detecting a face disposed within a digital image. The method comprises providing a digital image composed of a plurality of pixels and producing a binary image from the digital image by detecting skin colored pixels. The method further includes removing pixels corresponding to edges in the luminance component thereby producing binary image components; mapping the binary image components into at least one graph; and classifying the mapped binary image components as facial and non-facial types wherein the facial types serve as facial candidates.

In this way, as well as with the following aspects of the invention, a face disposed within a digital image can be detected.

Another aspect of the invention is a computer readable storage medium containing data for performing the steps of providing a digital image composed of a plurality of pixels and producing a binary image from the digital image by detecting skin colored pixels. The computer readable storage medium further contains data for removing pixels corresponding to edges in the luminance component thereby producing binary image components; mapping the binary image components into at least one graph; and classifying the mapped binary image components as facial and non-facial types wherein the facial types serve as facial candidates.

Yet another aspect of the invention is a method for detecting a face disposed within a digital image. The method comprises providing a digital image composed of a plurality of pixels and producing a binary image from the digital image by detecting skin colored pixels. The method further includes removing pixels corresponding to edges in the luminance component thereby producing binary image components; and classifying each of the binary image components as one of a facial type and a non-facial type. The classifying includes forming a bounding box around a classified component of the components and performing at least one of: comparing an area of the bounding box to a bounding box threshold; comparing an aspect ratio of the bounding box to an aspect ratio threshold; determining an area ratio, the area ratio being the comparison between the area of the classified component and the area of the bounding box, and comparing the area ratio to an area ratio threshold; determining an orientation of elongated objects within the bounding box; and determining a distance between a center of the bounding box and a center of the classified component.

It is an object of the invention to provide a method for detecting a face disposed within a digital image.

This object, as well as others, will become more apparent from the following description read in conjunction with the accompanying drawings where like reference numerals are intended to designate the same elements.

DETAILED DESCRIPTION OF THE PREFERRED EMBODIMENTS

Figure 1:
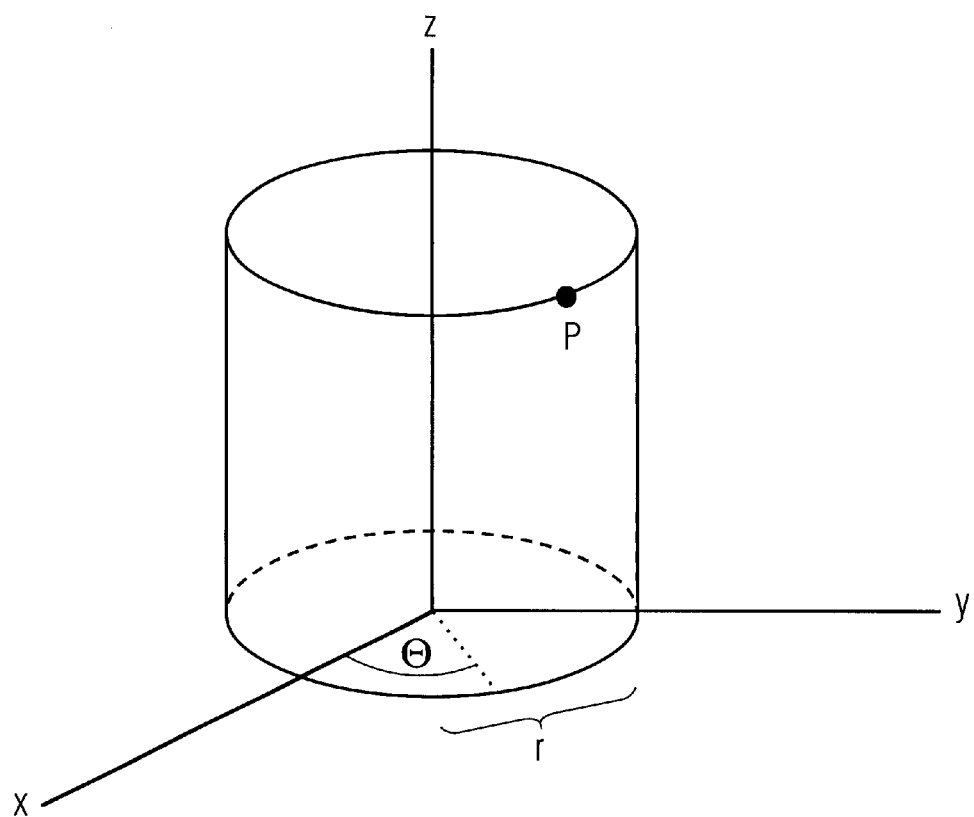
FIG. 1 is a diagram of a cylindrical coordinate system used for graphing colors of pixels in images.

Each pixel in an image is generally represented in the HSV (hue, saturation, value) color domain. These values are mapped onto a cylindrical coordinate system as shown in FIG. 1 where P is the value (or luminance), $\theta$ is the hue, and r is the saturation. Due to the non-linearity of cylindrical coordinate systems, other color spaces are used to approximate the HSV space. In the present applications, the YUV color space is used because most video material stored on a magnetic medium and the MPEG2 standard, both use this color space.

Figure 2A:
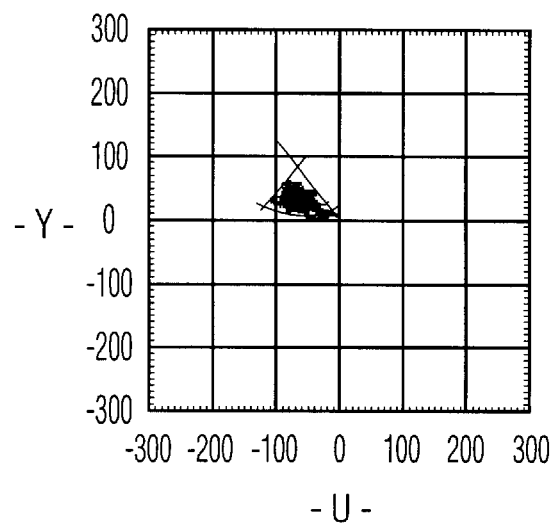
FIGS. 2A, 2B, and 2C are three graphs representing projections of the YUV color domain indicating the areas where skin colored pixels lie.
Figure 2B:
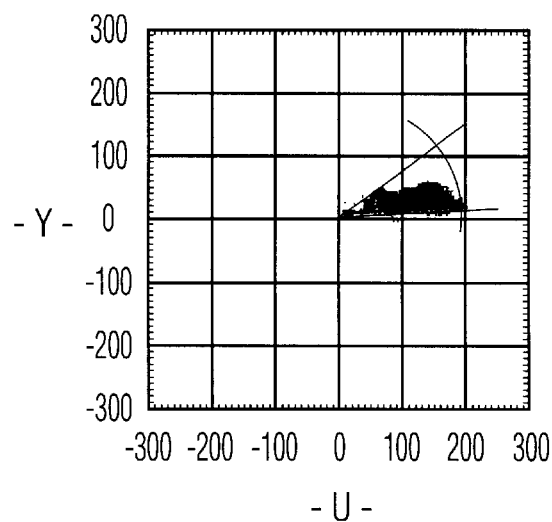
Figure 2C:
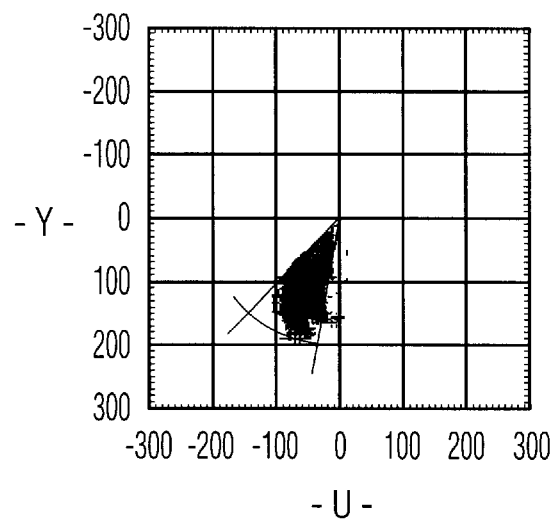

Transforming an RGB image into the YUV domain, and further projecting into the VU, VY, and VU planes, produces graphs like those shown in FIGS. 2A, 2B, and 2C. The circle segments represent the approximation of the HSV domain. When pixels corresponding to skin color are graphed in the YUV space, they generally fall into those circle segments shown. For example, when the luminance of a pixel has a value between 0 and 200, the chrominance U generally has a value between −100 and 0 for a skin colored pixel. These are general values based on experimentation. Clearly, a color training operation could be performed for each camera being used to capture images that include faces. The results of that training would then be used to produce more precise skin colored segments.

To detect a face, each pixel in an image is examined to discern whether it is skin colored. Those pixels which are skin colored are grouped from the rest of the image and are thus retained as potential face candidates. If at least one projection of a pixel does not fall within the boundaries of the skin cluster segment, the pixel is deemed not skin colored and removed from consideration as a potential face candidate.

Figure 3A:
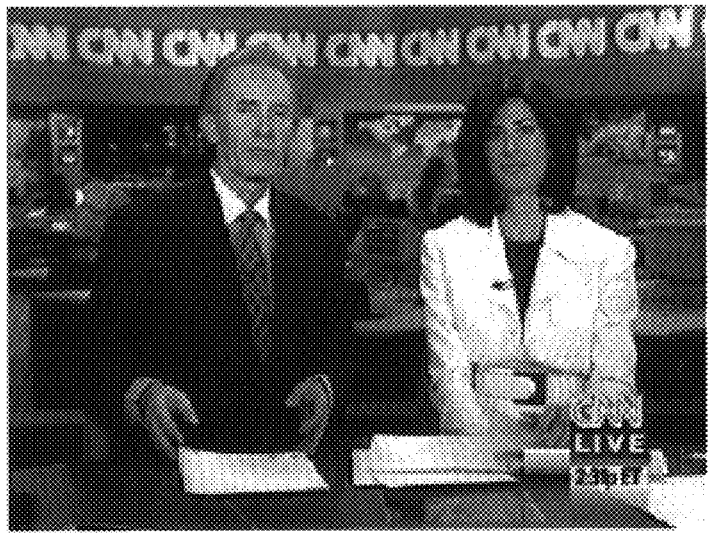
FIGS. 3A–3F are original images and respective binary images, the binary images being formed by grouping pixels based on color.
Figure 3B:
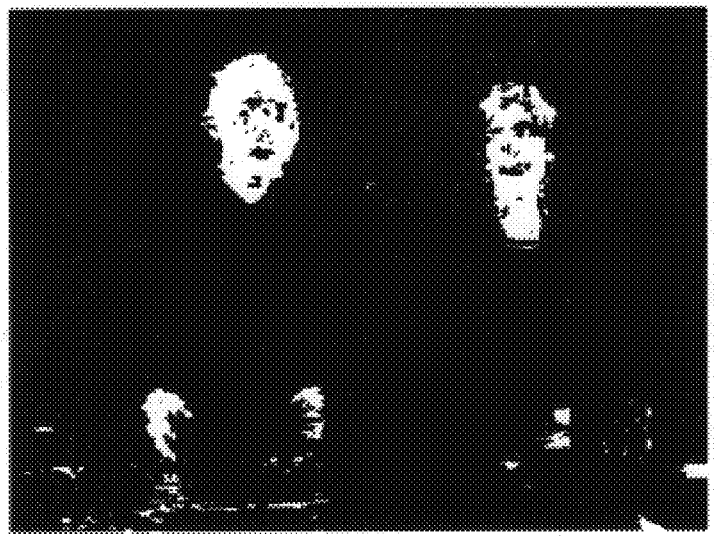
Figure 3C:
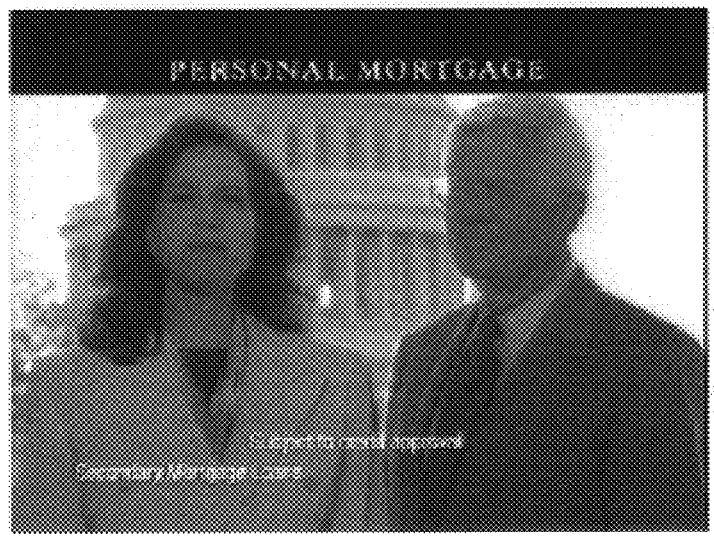
Figure 3D:
Figure 3E:
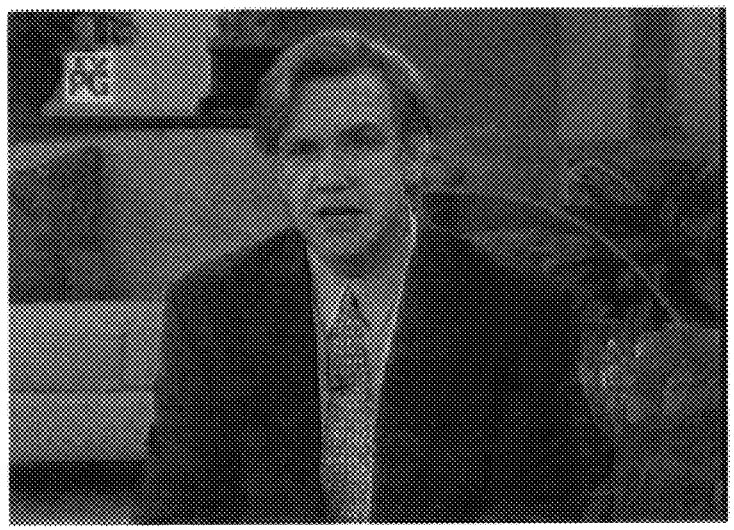
Figure 3F:
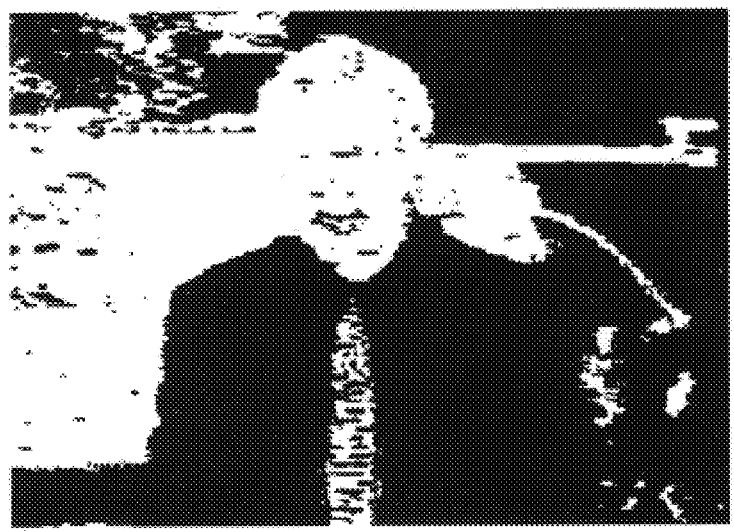

The resultant image formed by the skin color detection is binary because it shows either portions of the image which are skin color or portions which are not skin color as shown in FIGS. 3B, 3D, and 3F which correspond to original images in FIGS. 3A, 3C, and 3E respectively. In the figures, white is shown for skin color and black for non-skin color. As shown in FIGS. 3A and 3B, this detecting step alone may rule out large portions of the image as having a face disposed within it. Prior art techniques which use color and shape may thus work for simple backgrounds like that shown in FIG. 3A. However, looking at FIGS. 3C and 3D and FIGS. 3E and 3F, it is clear that detection by color and shape alone may not be sufficient to detect the faces. In FIGS. 3C–3F, objects in the background like leather, wood, clothes, and hair, have colors similar to skin. As can be seen in FIGS. 3D and 3F, these skin colored objects are disposed immediately adjacent to the skin of the faces and so the faces themselves are difficult to detect.

Figures 4, 5A, 5B:
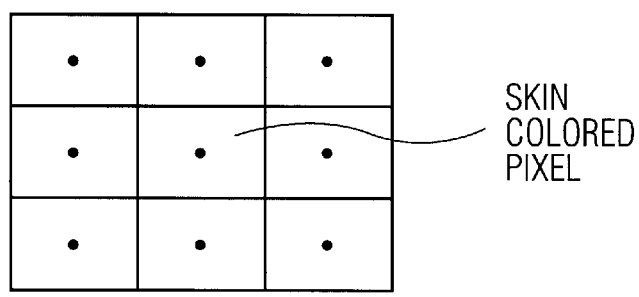
FIG. 4 is a diagram illustrating how a 3×3 mask is used as part of luminance variation detection in accordance with the invention.
FIGS. 5A and 5B are diagrams illustrating 4 and 8 type connectivity, respectively.

After the pixels are grouped by color, the pixels located on edges are removed from consideration. An edge is a change in the brightness level from one pixel to the next. The removal is accomplished by taking each skin colored pixel and calculating the variance in the pixels around it in the luminance component; a high variance being indicative of an edge. As is shown in FIG. 4, a box ("window"), the size of either 3×3 or 5×5 pixels is placed on top of a skin colored pixel. Clearly, other masks besides a square box could be used. The variance is defined as $$\frac{1}{n}\sum_{i=1}^{n}(x_i - \mu_x)^2$$

where $\mu_x$ is the average of all the pixels in the examined window. A "high" variance level will be different depending upon the face and the camera used in broadcasting the digital image. Therefore, an iterative routine is used starting with a very high variance level and working down to a low variance level.

At each step of the variance iteration, pixels are removed from facial consideration if the variance in the window around the skin colored pixel is greater than the variance threshold being tested for that iteration. After all of the pixels are examined in an iteration, the resulting connected components are examined for facial characteristics as is described more fully below. Connected components are pixels which are of the same binary value (white for facial color) and connected. Connectivity can be either 4 or 8 type connectivity. As shown in FIG. 5A, for 4 type connectivity, the center pixel is considered "connected" to only pixels directly adjacent to it as is indicated by the "1" in the adjacent boxes. In 8 type connectivity, as is shown in FIG. 5B, pixels diagonally touching the center pixel are also considered to be "connected" to that pixel.

Figure 7:
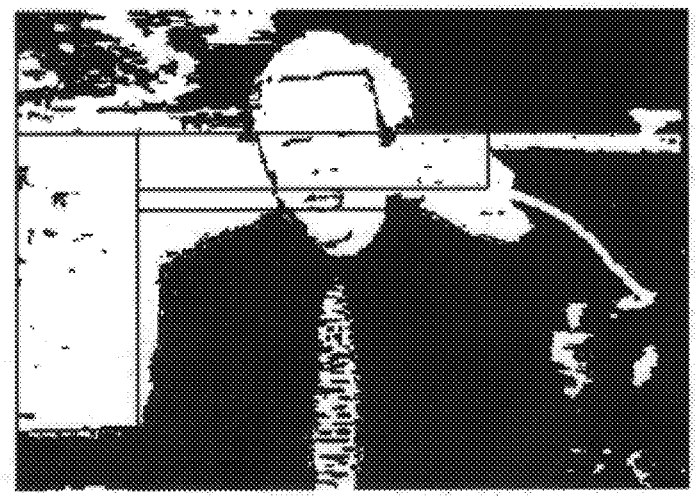
FIG. 7 is an image showing examples of bounding boxes applied to the image of FIG. 3F.

As stated above, after each iteration, the connected components are examined in a component classification step to see if they could be a face. This examination involves looking at 5 distinct criteria based upon a bounding box drawn around each resulting connected component; examples of which are shown in FIG. 7 based on the image of FIG. 3E. The criteria are:

1. The area of the bounding box compared to a threshold. This recognizes the fact that a face will generally not be very large or very small.
2. The aspect ratio (height compared to the width) of the bounding box compared to a threshold. This recognizes that human faces generally fall into a range of aspect ratios.
3. The ratio of the area of detected skin colored pixels to the area of the bounding box, compared to a threshold. This criteria recognizes that fact that the area covered by a human face will fall into a range of percentages of the area of the bounding box.
4. The orientation of elongated objects within the bounding box. There are many known ways of determining the orientation of a series of pixels. For example, the medial axis can be determined and the orientation can be found from that axis. In general, faces are not rotated significantly about the axis ("z-axis") which is perpendicular to the plane having the image and so components with elongated objects that are rotated with respect to the z-axis are removed from consideration.
5. The distance between the center of the bounding box and the center of mass of the component being examined. Generally, faces are located within the center of the of the bounding box and will not, for example, be located all to one side.

Figure 6A:
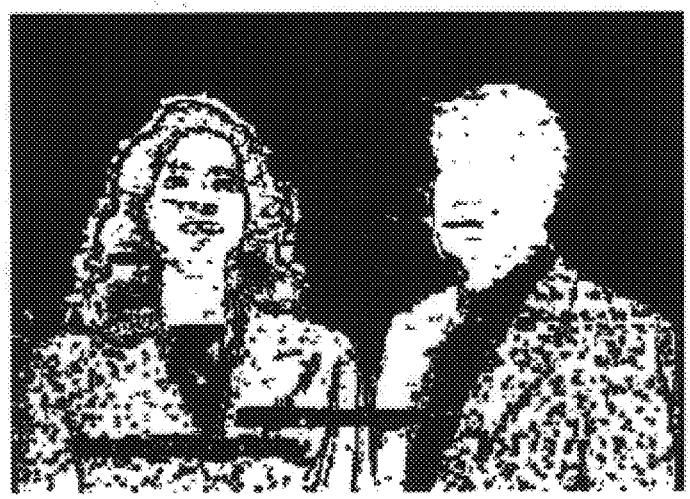
FIGS. 6A and 6B are images showing what the image of FIGS. 3C and 3E would look like after the edges are removed in accordance with the invention.
Figure 6B:
Figure 8:
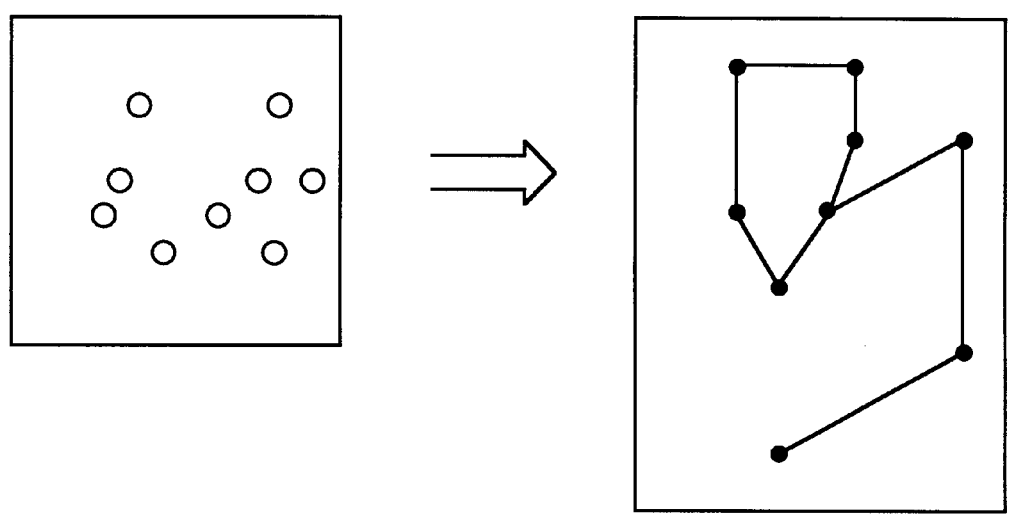
FIG. 8 is a sequence of diagrams showing how components of an image are represented by vertices and connected to form a graph in accordance with the invention.

The iterations for variance are continued thereby breaking down the image into smaller components until the size of the components is below a threshold. The images of FIGS. 3C and 3E are shown transformed in FIGS. 6A and 6B respectively after the variance iteration process. As can be discerned, faces in the image were separated from the non-facial skin colored areas in the background as a result of the variance iteration. Frequently, this causes the area with detected skin color to be fragmented as is exemplified in FIG. 6B. This occurs because either there are objects occluding portions of the face (like eyeglasses or facial hair) or because portions were removed due to high variance. It would thus be difficult to look for a face using the resulting components by themselves. The components that still can be part of face after the variance iteration and component classification steps, are mapped on to a graph as shown in FIG. 8. In this way, skin colored components that have similar features, and are close in space, are grouped together and then further examined.

Referring to FIG. 8, each resulting component (that survives the color detecting, edge removal, and component classification steps) is represented by a vertex of a graph. Vertices are connected if they are close in space in the original image and if they have a similar color in the original image. Two components, i and j, have a similar color if:

$$|Y_i-Y_j|<t_y \wedge |U_i-U_j|<t_u \wedge |V_i-V_j|<t_v$$

where $Y_n$, $U_n$, and $V_n$, are the average values of the luminance and chrominance of the $n^{th}$ component and $t_n$ are threshold values. The thresholds are based upon variations in the Y, U, and V values in faces and are kept high enough so that components of the same face will be considered similar. Components are considered close in space if the distance between them is less than a threshold. The spatial requirement ensures that spatially distant components are not grouped together because portions of a face would not normally be located in spatially distant portions of an image.

The connection between vertices is called an edge. Each edge is given a weight which is proportional to the Euclidean distance between the two vertices. Connecting the vertices together will result in a graph or a set of disjointed graphs. For each of the resulting graphs, the minimum spanning tree is extracted. The minimum spanning tree is generally defined as the subset of a graph where all of the vertices are still connected and the sum of the lengths of the edges of the graph is as small as possible (minimum weight). The components corresponding to each resulting graph are classified as either face or not face using the shape parameters defined in the component classification step mentioned above except that now all the components in a graph are classified as a whole instead of one component at a time. Then each graph is split into two graphs by removing the weakest edge (the edge with the greatest weight) and the corresponding components of the resulting graphs are examined again. The division continues until the area of a bounding box formed around the resultant graphs is smaller than a threshold.

By breaking down and examining each graph for a face, a set of all the possible locations and sizes of faces in an image is determined. This set may contain a large number of false positives and so a heuristic is applied to remove some of the false positives. Looking for all the facial features (i.e. nose, mouth, etc.) would require a template which would yield too large of a search space. However, experimentation has shown that those facial features have edges with a high variance. Many false positives can be removed by examining the ratio of high variance pixels inside a potential face, to the overall number of pixels in the potential face.

The aforementioned heuristic is effectuated by first applying a morphological closing operation to the facial candidates within the image. As is known in the art, a mask is chosen and applied to each pixel within a potential facial area. For example, a 3×3 mask could be used. A dilation algorithm is applied to expand the borders of face candidate components. Then an erosion algorithm is used to eliminate pixels from the borders. One with ordinary skill in the art will appreciate that these two algorithms, performed in this order, will fill in gaps between components and will also keep the components at substantially the same scale. Clearly, one could perform multiple dilation and then multiple erosion steps as long as the both are applied an equal number of times.

Figure 9A:
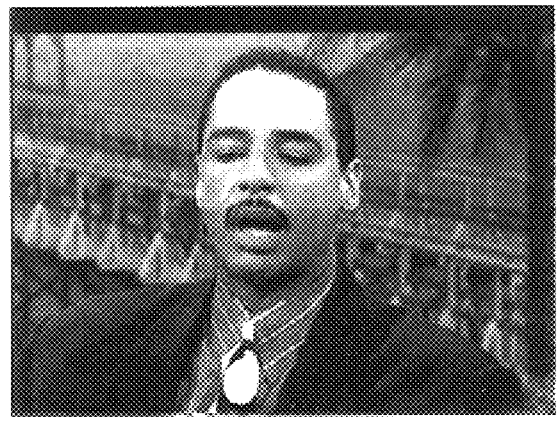
FIGS. 9A–9D are a sequence of images illustrating the application of a heuristic according to the invention.
Figure 9B:
Figure 9C:
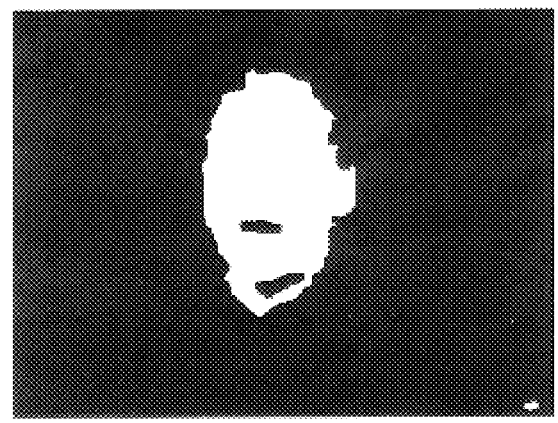
Figure 9D:

Now, the ratio of pixels with a high variance neighborhood inside the face candidate area is compared to the total number of pixels in the face candidate area. Referring to FIGS. 9A to 9D, an original image in FIG. 9A is examined for potential face candidates using the methods described above to achieve the binary image shown in FIG. 9B. The morphological closing operation is performed on the binary image resulting in the image shown in FIG. 9C. Finally, pixels with high variance located in the image of FIG. 9C are detected as is shown in FIG. 9D. The ratio of the high variance pixels to the total number of pixels can then be determined.

Figure 10:
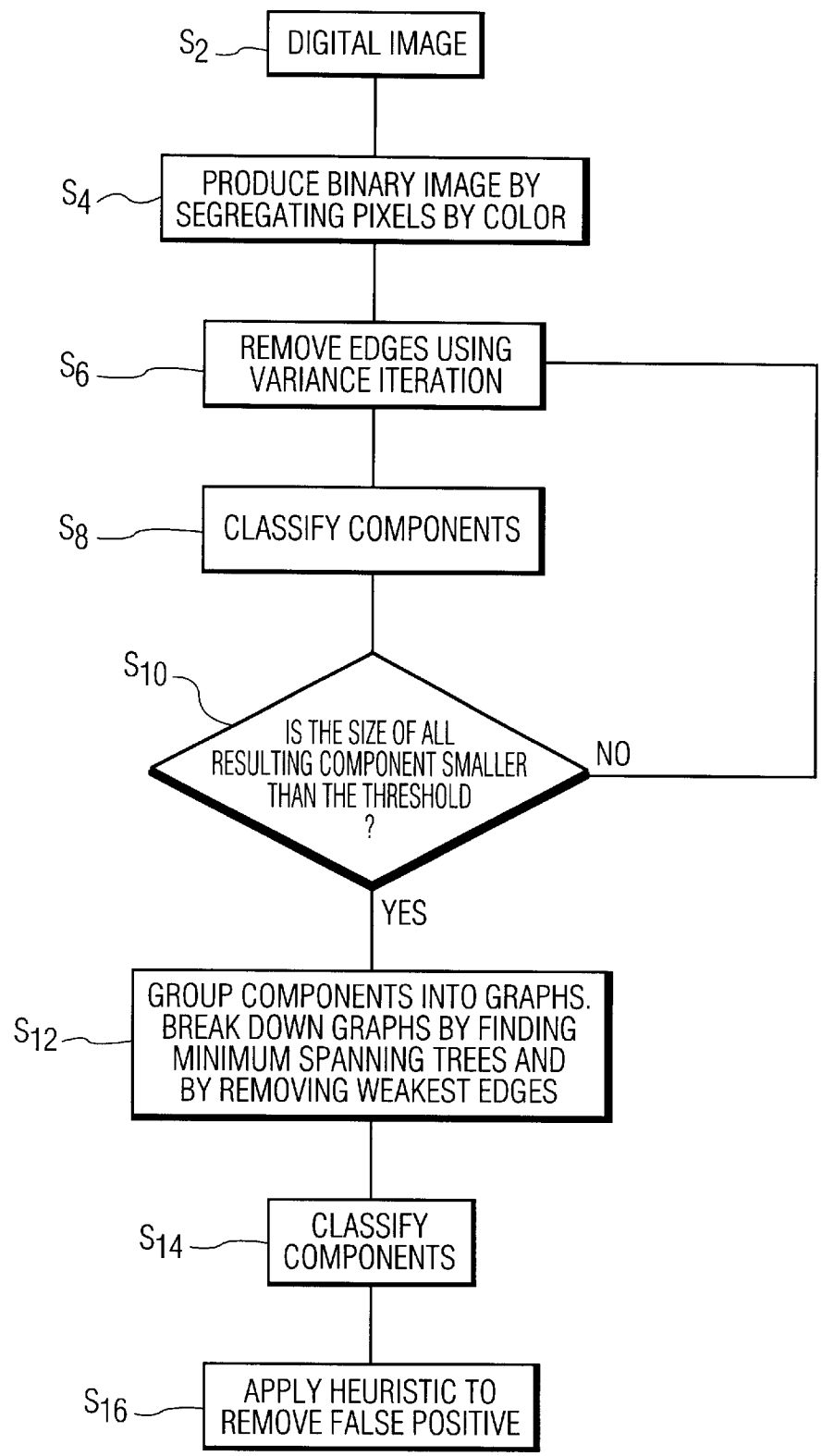
FIG. 10 is a flow chart detailing the general steps involved in the invention.

As can be discerned, the invention, through detecting pixels that are skin colored, removing edges, grouping components, classifying components, and applying a heuristic, thereby detects faces disposed within a digital image. The method can be summarized by steps S2–S16 shown in FIG. 10. The data for performing the steps can be stored on a computer readable storage medium such as a CD-rom or a floppy disk.

Having described the preferred embodiments it should be made apparent that various changes could be made without departing from the scope and spirit of the invention which is defined more clearly in the appended claims.

What is claimed is:

1. A method for detecting a face disposed within a digital image, comprising the steps of:

providing a digital image composed of a plurality of pixels;

providing a binary image from the digital image by detecting skin colored pixels;

removing pixels corresponding to edges in the luminance component of said binary image thereby producing binary image components;

mapping said binary image components into at least one graph; and classifying said mapped binary image components as facial and non-facial types wherein the facial types serve as facial candidates, further comprising the step of applying a heuristic, said heuristic including in the following steps:

applying a morphological closing operation on each of said facial candidates to produce at least one closed facial candidate;

determining high variance pixels in said closed facial candidate;

determining the ratio between said high variance pixels and the total number of pixels in said closed facial candidate; and comparing said ratio to a threshold.

2. A method for detecting a face disposed within a digital image, comprising the steps of:

providing a digital image composed of a plurality of pixels;

providing a binary image from the digital image by detecting skin colored pixels;

removing pixels corresponding to edges in the luminance component of said binary image thereby producing binary image components;

mapping said binary image components into at least one graph; and classifying said mapped binary image components as facial and non-facial types wherein the facial types serve as facial candidates wherein said step of removing includes:
  applying a mask to a plurality of said pixels including an examined pixel;
  determining the variance between said examined pixel and pixels disposed within said mask; and comparing said variance to a variance threshold wherein:
  said step of removing is repeated for decreasing variance thresholds until a size or said binary image components is below a component size threshold; and
  after each step of removing, each of said binary image components is classified as one of the facial type and non-facial type.

3. A method for detecting a face disposed within a digital image, comprising the steps of:
  providing a digital image composed of a plurality of pixels;
  providing a binary image from the digital image by detecting skin colored pixels;
  removing pixels corresponding to edges in the luminance component of said binary image thereby producing binary image components;
  mapping said binary image components into at least one graph; and
  classifying said mapped binary image components as facial and non-facial types wherein the facial types serve as facial candidates wherein said step of removing includes:
    applying a mask to a plurality of said pixels including an examined pixel;
    determining the variance between said examined pixel and pixels disposed within said mask; and
  comparing said variance to a variance threshold wherein:
    said step of removing is repeated for decreasing variance thresholds until a size of said binary image components is below a component size threshold; and
    after each step of removing, each of said binary image components is classified as one of the facial type and non-facial type,
  wherein said binary image components are connected.

4. A method for detecting a face disposed within a digital image, comprising the steps of:
  providing a digital image composed of a plurality of pixels;
  providing a binary image from the digital image by detecting skin colored pixels;
  removing pixels corresponding to edges in the luminance component of said binary image thereby producing binary image components;
  mapping said binary image components into at least one graph; and
  classifying said mapped binary image components as facial and non-facial types wherein the facial types serve as facial candidates,
  wherein said step of mapping comprises the following steps:
    representing each component as a vertex;
    connecting vertices with an edge when close in space and similar in color, thereby forming said at least one graph.

5. A method for detecting a face disposed within a digital image, comprising the steps of:
  providing a digital image composed of a plurality of pixels;
  providing a binary image from the digital image by detecting skin colored pixels;
  removing pixels corresponding to edges in the luminance component of said binary image thereby producing binary image components;
  mapping said binary image components into at least one graph; and
  classifying said mapped binary image components as facial and non-facial types wherein the facial types serve as facial candidates,
  wherein said step of mapping comprises the following steps:
    representing each component as a vertex;
    connecting vertices with an edge when close in space and similar in color, thereby forming said at least one graph,
  wherein each edge has an associated weight and further comprising the steps of:
    extracting the minimum spanning tree of each graph;
    classifying the corresponding binary image components of each graph as one of the facial type and non-facial type;
    removing the edge in each graph with the greatest weight thereby forming two smaller graphs; and
    repeating said step of classifying the corresponding binary image components for each of said smaller graphs until a bounding box around said smaller graphs is smaller than a graph threshold.

* * * * *